(12) United States Patent
Chen et al.

(10) Patent No.: US 12,265,037 B2
(45) Date of Patent: Apr. 1, 2025

(54) CYLINDRICAL SHELL DETECTION METHOD AND CYLINDRICAL SHELL DETECTION DEVICE

(71) Applicant: Advanced ACEBIOTEK CO., LTD., Hsinchu County (TW)

(72) Inventors: Jyh-Chern Chen, New Taipei (TW); Yi-Ping Lin, Tainan (TW); Yung-Chou Hsu, New Taipei (TW); Shen-Fu Hsu, Hsinchu County (TW)

(73) Assignee: Advanced ACEBIOTEK CO., LTD., Hsinchu County (TW)

( * ) Notice: Subject to any disclaimer, the term of this patent is extended or adjusted under 35 U.S.C. 154(b) by 313 days.

(21) Appl. No.: 17/986,880

(22) Filed: Nov. 14, 2022

(65) Prior Publication Data
US 2024/0060909 A1 Feb. 22, 2024

(30) Foreign Application Priority Data
Aug. 16, 2022 (TW) .................................. 111130751

(51) Int. Cl.
*G01N 21/94* (2006.01)
*G01N 21/84* (2006.01)
(Continued)

(52) U.S. Cl.
CPC ......... *G01N 21/94* (2013.01); *G01N 21/8422* (2013.01); *G01N 21/8806* (2013.01);
(Continued)

(58) Field of Classification Search
None
See application file for complete search history.

(56) References Cited

U.S. PATENT DOCUMENTS

| | | | |
|---|---|---|---|
| 6,677,571 B1 | 1/2004 | Clark | |
| 8,513,608 B2 * | 8/2013 | Ohtake | G01N 21/8422 250/341.1 |

(Continued)

FOREIGN PATENT DOCUMENTS

| | | |
|---|---|---|
| CN | 102565551 A | 7/2012 |
| CN | 112526227 A | 3/2021 |

(Continued)

*Primary Examiner* — Thomas R Artman
(74) *Attorney, Agent, or Firm* — Winston Hsu

(57) ABSTRACT

A cylindrical shell detection method includes generating a first and a second terahertz transmitting electromagnetic waves; detecting a plurality of first terahertz reflected electromagnetic waves reflected by the first terahertz transmitting electromagnetic wave incident in a plurality of inner interface layers of a cylindrical shell; detecting a plurality of second terahertz reflected electromagnetic waves reflected by the second terahertz transmitting electromagnetic wave incident in a plurality of outer interface layers of a cylindrical shell; measuring a plurality of first characteristic signals according to the first terahertz transmitting electromagnetic waves and the first terahertz reflected electromagnetic waves to determine a plurality of first characteristics of the plurality of inner interface layers; and measuring a plurality of second characteristic signals according to the second terahertz transmitting electromagnetic waves and the plurality of second terahertz reflected electromagnetic waves to determine a plurality of second characteristics of the plurality of inner interface layers.

18 Claims, 11 Drawing Sheets

(51) Int. Cl.
    *G01N 21/88*     (2006.01)
    *G01N 21/952*     (2006.01)
    *G01N 21/954*     (2006.01)

(52) U.S. Cl.
    CPC ......... *G01N 21/952* (2013.01); *G01N 21/954* (2013.01); *G01N 2021/8427* (2013.01); *G01N 2021/8438* (2013.01); *G01N 2021/8841* (2013.01); *G01N 2021/9544* (2013.01); *G01N 2021/9546* (2013.01); *G01N 2021/9548* (2013.01)

(56) References Cited

U.S. PATENT DOCUMENTS

| | | | |
|---|---|---|---|
| 8,772,718 B2 * | 7/2014 | Ouvrier-Buffet | G01J 5/20 250/349 |
| 9,841,272 B2 * | 12/2017 | Takayanagi | G01B 11/0641 |
| 10,753,866 B2 * | 8/2020 | Klose | G01N 21/3581 |
| 11,225,008 B2 * | 1/2022 | Nerling | B29C 44/507 |
| 12,055,378 B2 * | 8/2024 | Kim | G01D 1/12 |
| 12,055,386 B2 * | 8/2024 | Holle | G01B 15/02 |
| 2007/0040067 A1 | 2/2007 | D'Ausilio | |
| 2012/0097853 A1 * | 4/2012 | Ouvrier-Buffet | G01J 5/068 250/349 |
| 2012/0326037 A1 * | 12/2012 | Ohtake | G01B 11/0633 250/338.1 |
| 2016/0069673 A1 * | 3/2016 | Takayanagi | G01B 11/0641 250/339.11 |
| 2018/0194055 A1 * | 7/2018 | Nerling | B29C 48/09 |
| 2019/0331594 A1 * | 10/2019 | Klose | G01N 21/952 |
| 2022/0268576 A1 * | 8/2022 | Holle | G01B 15/04 |
| 2022/0316860 A1 * | 10/2022 | Kim | G01D 1/12 |
| 2023/0095853 A1 * | 3/2023 | Thiel | G01N 21/3563 356/432 |
| 2024/0060909 A1 * | 2/2024 | Chen | G01N 21/952 |

FOREIGN PATENT DOCUMENTS

| | | | | |
|---|---|---|---|---|
| DE | 102021125111 A1 * | 3/2023 | ........ | G01B 11/0625 |
| JP | 2006153845 A * | 6/2006 | | |

* cited by examiner

CYLINDRICAL SHELL DETECTION METHOD AND CYLINDRICAL SHELL DETECTION DEVICE

BACKGROUND OF THE INVENTION

1. Field of the Invention

The present invention relates to a cylindrical shell detection method and a cylindrical shell detection device, and more particularly, to a detection method and detection device for detecting defects on the inner side surface and the outer side surface of a cylindrical shell.

2. Description of the Prior Art

Solid rocket thrusters provide propulsion to aerospace vehicles, and are widely used in air transportation, low-orbit communication satellites and space exploration. As shown in FIG. 1, which is a schematic diagram of a solid rocket thruster 10. The solid rocket thruster 10 consists of a cylindrical shell 100, an inner thermal-insulating flame-retardant layer 102, an outer thermal-insulating layer 104, a solid propellant 106, an igniter 108 and a nozzle 110. In detail, the outer thermal-insulating layer 104 covers on the cylindrical shell 100. When the solid rocket thruster 10 flies at a high speed, the outer thermal-insulating layer 104 will reduce the high heat generated by air friction, which in turn, will reduce the mechanical strength of the cylindrical shell 100. The inner thermal-insulating flame-retardant layer 102 is configured between the inner surface of the cylindrical shell 100 and the solid propellant 106, and will provide thermal insulation and flame-retardant protection to the cylindrical shell 100. The igniter 108 ignites the solid propellant in a combustion chamber 112 to produce high-temperature and high-pressure combustion products. The combustion products expand in the combustion chamber 112 and are fired through the nozzle 110 to generate enormous propulsion. However, a plurality of interface layers of the outer thermal-insulating layer 104 and the inner thermal-insulating flame-retardant layer 102, or the interface surfaces between the outer thermal-insulating layer 104 or the inner thermal-insulating flame-retardant layer 102 and the cylindrical shell 100 may have voids, gaps, delaminations and other defects. In addition, the plurality interface surfaces of the outer thermal-insulating layer 104 and the inner thermal-insulating flame-retardant layer 102 may include impurities. When the solid rocket thruster 10 flies at the high speed, the high-temperature and high-pressure combustion products may be transmitted to the local position of the cylindrical shell 100 through the defects, resulting in the eutectic and structural disintegration of the cylindrical shell 100. Therefore, it is very important to measure and process to remove the defects of the outer thermal-insulating layer 104 and the inner thermal-insulating flame-retardant layer 102 before filling the solid propellant into the solid rocket thruster 10.

However, at present, some of the defect detection methods of the solid rocket thruster 10 require a high-performance measurement system, and the cost is too high. The other defect detection methods may only detect the surface of the solid thruster or the detection resolution is too low to detect the internal defects of the solid rocket thruster 10.

Therefore, it is necessary to improve the prior art.

SUMMARY OF THE INVENTION

Therefore, the purpose of the present invention is to provide a cylindrical shell detection method and a cylindrical shell detection device to improve the drawbacks of the prior art.

The embodiment of the present invention discloses a cylindrical shell detection method comprising generating a first terahertz transmitting electromagnetic wave, and emitting the first transmitting electromagnetic wave to an inner side surface of a cylindrical shell, wherein the inner side surface comprises a plurality of inner interface layers; generating a second terahertz transmitting electromagnetic wave, and emitting the second terahertz transmitting electromagnetic wave to an outer side surface of the cylindrical shell, wherein the outer side surface comprises a plurality of outer interface layers; detecting a plurality of first terahertz reflected electromagnetic waves reflected by the first transmitting electromagnetic wave emitted to the plurality of inner interface layers of the inner side surface; detecting a plurality of second terahertz reflected electromagnetic waves reflected by the second terahertz transmitting electromagnetic wave emitted to the plurality of outer interface layers of the outer side surface; measuring a plurality of first characteristic signals according to the first transmitting electromagnetic wave and the plurality of first terahertz reflected electromagnetic waves; measuring a plurality of second characteristic signals according to the second terahertz transmitting electromagnetic wave and the plurality of second terahertz reflected electromagnetic waves; and analyzing the plurality of first characteristic signals and the plurality of second characteristic signals to determine a plurality of first characteristics of the plurality of inner interface layers and a plurality of second characteristics of the plurality of outer interface layers.

The embodiment of the present invention discloses a cylindrical shell detection device comprising a first terahertz transmitting electromagnetic wave generator, configured to generate a first transmitting electromagnetic wave and emit the first transmitting electromagnetic wave to an inner side surface of a cylindrical shell, wherein the inner side surface comprises a plurality of inner interface layers; a second terahertz transmitting electromagnetic wave generator, configured to generate a second terahertz transmitting electromagnetic wave and emit the second terahertz transmitting electromagnetic wave to an outer side surface of the cylindrical shell, wherein the outer side surface comprises a plurality of outer interface layers; a first terahertz transmitting electromagnetic wave receiver, configured to detect a plurality of first terahertz reflected electromagnetic waves reflected by the first transmitting electromagnetic wave emitted to the plurality of inner interface layers of the inner side surface; a second terahertz transmitting electromagnetic wave receiver, configured to detect a plurality of second terahertz reflected electromagnetic waves reflected by the second terahertz transmitting electromagnetic wave emitted to the plurality of outer interface layers of the outer side surface; and a detection device, coupled to the first terahertz transmitting electromagnetic wave generator, the second terahertz transmitting electromagnetic wave generator, the first terahertz transmitting electromagnetic wave receiver and the second terahertz transmitting electromagnetic wave receiver, configured to measure the plurality of first characteristic signals and the plurality of second characteristic signals, to determine a plurality of first characteristics of the plurality of inner interface layers and a plurality of second characteristics of the plurality of outer interface layers according to the first transmitting electromagnetic wave, the plurality of first terahertz reflected electromagnetic waves, the second terahertz transmitting electromagnetic wave and the plurality of second terahertz reflected electromagnetic waves.

The embodiment of the present invention discloses a cylindrical shell detection device, comprising a first terahertz transmitting electromagnetic wave generator, configured to generate a first transmitting electromagnetic wave and emit the first transmitting electromagnetic wave to an inner side surface of a cylindrical shell, wherein the inner side surface comprises a plurality of inner interface layers; a first terahertz transmitting electromagnetic wave receiver, configured to detect a plurality of first terahertz penetrating electromagnetic waves penetrated by the first transmitting electromagnetic wave emitted to the plurality of inner interface layers of the inner side surface and penetrate through the cylindrical shell and an outer side surface of the cylindrical shell, wherein the outer side surface comprises a plurality of outer interface layers; and a detection device, coupled to the first terahertz transmitting electromagnetic wave generator and the first terahertz transmitting electromagnetic wave receiver, configured to measure the plurality of first characteristic signals to determine a plurality of first characteristics of the plurality of inner interface layers and a plurality of second characteristics of the plurality of outer interface layers according to the first transmitting electromagnetic wave and the plurality of first terahertz penetrating electromagnetic waves.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". "Approximately" means that within the acceptable error range, a person with ordinary knowledge in the field can solve the technical problem within a certain error range and basically achieve the technical effect. Also, the term "couple" is intended to mean either an indirect or direct, wired or wireless electrical connection.

Figure 1:
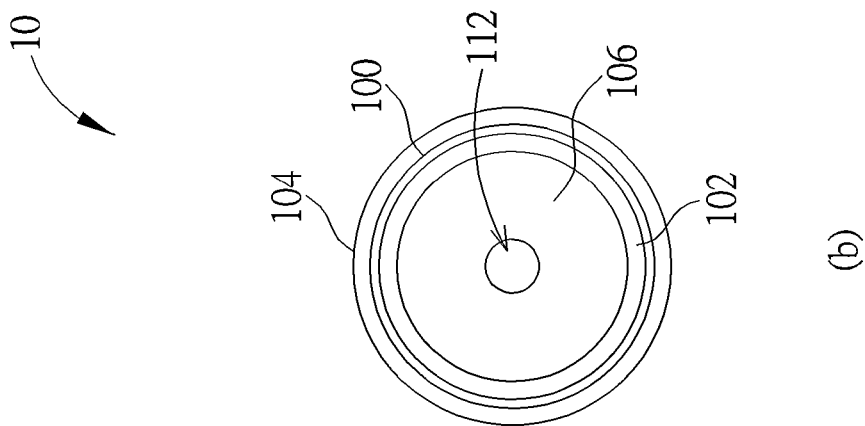
FIG. 1 is a schematic diagram illustrating a solid rocket thruster.
Figure 1:
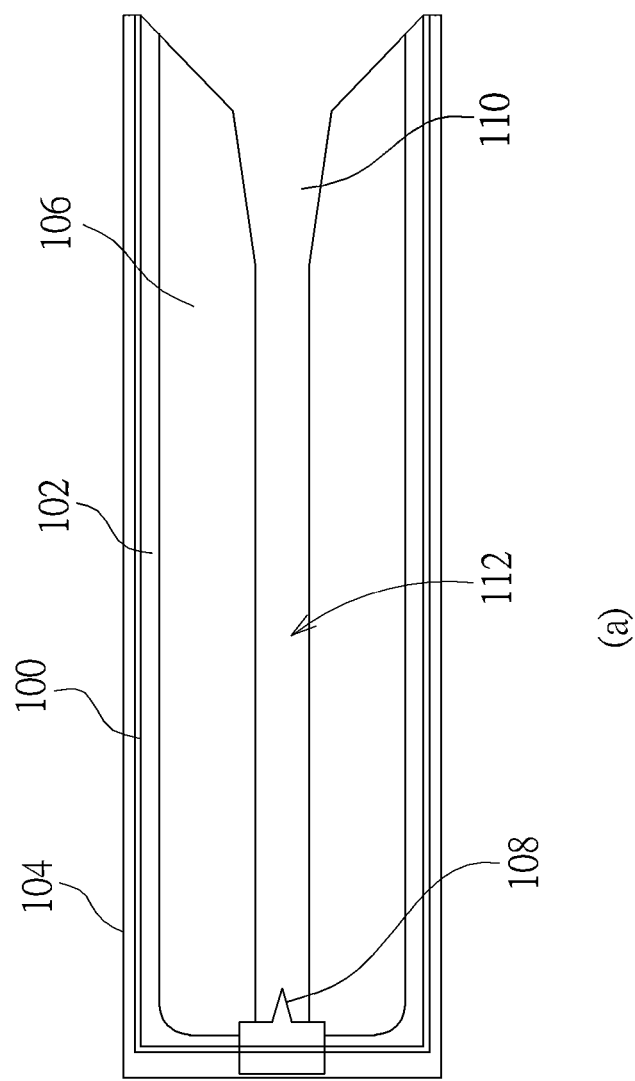
Figure 2:
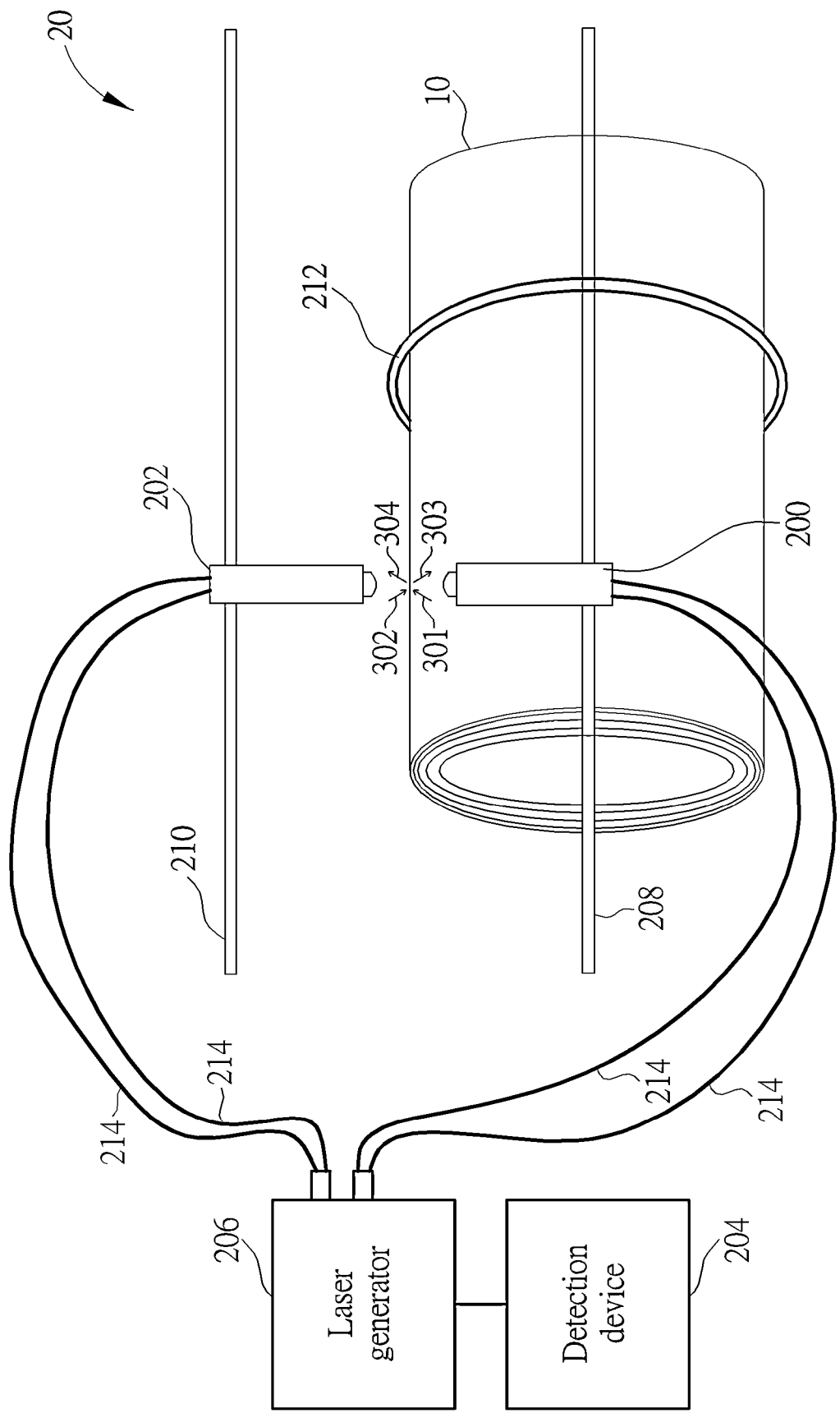
FIG. 2 is a schematic diagram illustrating a cylindrical shell detection device according to an embodiment of the present invention.

FIG. 2 is a schematic diagram illustrating a cylindrical shell detection device 20 according to an embodiment of the present invention. The cylindrical shell detection device 20 detects the defects of the inner thermal-insulating flame-retardant layer 102 and the outer thermal-insulating layer 104 of the solid rocket thruster 10. In the embodiment, the cylindrical shell detection device 20 includes a first terahertz electromagnetic wave sensor 200, a second terahertz electromagnetic wave sensor 202, a detection device 204, a laser generator 206, an inner sensing bracket 208, an outer sensing bracket 210 and a cylindrical shell bracket 212. The laser generator 206 may generate an pumping pulse laser and a probing pulse laser and transmit the pumping pulse laser and the probing pulse laser to the first terahertz electromagnetic wave sensor 200 and the second terahertz electromagnetic wave sensor 202, wherein a pulse width of the pumping pulse laser and the probing pulse laser is less than a picosecond. The first terahertz electromagnetic wave sensor 200 may generate a first transmitting electromagnetic wave 301, and receive a first terahertz reflected electromagnetic wave 303 reflected by the first transmitting electromagnetic wave 301 emitted to an inner side surface of the solid rocket thruster 10. The second terahertz electromagnetic wave sensor 202 may generate the second terahertz transmitting electromagnetic wave 302, and receive a second terahertz reflected electromagnetic wave 304 reflected by the second terahertz transmitting electromagnetic wave 302 emitted to an outer side surface of the solid rocket thruster 10. The detection device 204 is coupled to the first terahertz electromagnetic wave sensor 200 and the second terahertz electromagnetic wave sensor 202, and is configured to analyze the first transmitting electromagnetic wave 301, the second terahertz transmitting electromagnetic wave 302, the first terahertz reflected electromagnetic wave 303 and the second terahertz reflected electromagnetic wave 304 emitted to the solid rocket thruster 10, to determine characteristics of the inner thermal-insulating flame-retardant layer 102 and the outer thermal-insulating layer 104.

In detail, the cylindrical shell bracket 212 is coupled to the cylindrical shell 100, and is configured to guide the cylindrical shell 100 to rotate around an inner axial direction. For example, an inner axial direction may be a central axis of the cylindrical shell 100. The inner sensing bracket 208 is coupled to the first terahertz electromagnetic wave sensor 200, and is configured to guide the first terahertz electromagnetic wave sensor 200 to move along the inner axial direction. The outer sensing bracket 210 is coupled to the second terahertz electromagnetic wave sensor 202, and is configured to guide the second terahertz electromagnetic wave sensor 202 to move along an outer axial direction to a position corresponding to the first terahertz electromagnetic wave sensor 200. However, the guidance methods of the cylindrical shell bracket 212, the inner sensing bracket 208 and the outer sensing bracket 210 are not limit thereto, as long as the guidance method may make the emitting angles of the first terahertz electromagnetic wave sensor 200 and the second terahertz electromagnetic wave sensor 202 respectively emitting the first transmitting electromagnetic wave 301 and the second terahertz transmitting electromagnetic wave 302 to the solid rocket thruster 10 to be perpendicular to a sectional plane of the cylindrical shell 100. For example, the cylindrical shell bracket 212 may guide the cylindrical shell 100 to move along the inner axial direction, the inner sensing bracket 208 may guide the first terahertz electromagnetic wave sensor 200 to rotate around the inner axial direction, and the outer sensing bracket 210 may guide the second terahertz electromagnetic wave sensor 202 to rotate to a relative position corresponding to the first terahertz electromagnetic wave sensor 200. In another embodiment, the guidance method may make the cylindrical shell bracket, the inner sensing bracket and the outer sensing bracket to guide the cylindrical shell 100, the first terahertz electromagnetic wave and the second terahertz electromagnetic wave at a vertical distance of a specific distance according to a signal strength of the first terahertz reflected electromagnetic wave 303 and the second terahertz reflected electromagnetic wave 304. In addition, the guidance method may also make the first terahertz reflected electromagnetic wave 303 and the second terahertz reflected electromagnetic wave 304 to focus on the cylindrical shell 100. It should be noted that, the cylindrical shell detection device 20 may further include an optical detector. The optical detector is configured to detect the distance between the cylindrical shell and the first terahertz electromagnetic wave sensor 200 and the second terahertz electromagnetic wave sensor 202. In this way, the cylindrical shell bracket 212, the inner sensing bracket 208 and the outer sensing bracket 210 may guide the cylindrical shell to a specific distance from the first terahertz electromagnetic wave sensor 200 and the second terahertz electromagnetic wave sensor 202, and make the first terahertz reflected electromagnetic wave 303 and the second terahertz reflected electromagnetic wave 304 to focus on the cylindrical shell 100.

The laser generator 206 may be a Ti:Sapphire femtosecond laser generator or a fiber femtosecond laser generator. The Ti:Sapphire femtosecond laser generator generates an IR pulse beam, a central wavelength of the IR pulse beam is 800 nm, a repetition rate is 76 MHz and output power is 1.1 W. The IR pulse beam is divided into the probing pulse laser and the pumping pulse laser after passing through a beam splitter. The pumping pulse laser is focused on the first terahertz electromagnetic wave sensor 200 and the second terahertz electromagnetic wave sensor 202 through a plurality of optical elements and optical fiber 214 to respectively form the first transmitting electromagnetic wave 301 and the second terahertz transmitting electromagnetic wave 302. The probing pulse laser passes through a delay device to extend a light path and generates a delay time with the pumping pulse laser. And the probing pulse laser is then guided to the first terahertz electromagnetic wave sensor 200 and the second terahertz electromagnetic wave sensor 202 to start detecting the first terahertz reflected electromagnetic wave 303 and the second terahertz reflected electromagnetic wave 304. The delay device may include an electronically controlled translation stage and a reflective element. The electronically controlled translation stage moves back and forth along the optical path, so that the probing pulse laser corresponds to the first transmitting electromagnetic wave 301 and the second terahertz transmitting electromagnetic wave 302 excited by the pumping pulse laser at different delay times. Furthermore, the first terahertz electromagnetic wave sensor 200, the second terahertz electromagnetic wave sensor 202 and the plurality of optical elements may be configured in a moisture isolation box and purged with dry nitrogen or air to avoid the first transmitting electromagnetic wave 301, the second terahertz transmitting electromagnetic wave 302, the first terahertz reflected electromagnetic wave 303 and the second terahertz reflected electromagnetic wave 304 from being absorbed by molecules in the air and resulting in loss of strength. It should be noted that, the first terahertz electromagnetic wave sensor 200 and the second terahertz electromagnetic wave sensor 202 may be a GaAs photoconductive antenna and a ZnTe non-linear crystal for generating the first transmitting electromagnetic wave 301 and the second terahertz transmitting electromagnetic wave 302, and detecting the first terahertz reflected electromagnetic wave 303 and the second terahertz reflected electromagnetic wave 304, but is not limited thereto. In addition, the beam splitter, the plurality of optical elements and the delay device are known in the art, and not described here and not shown in FIG. 2.

Figure 3:
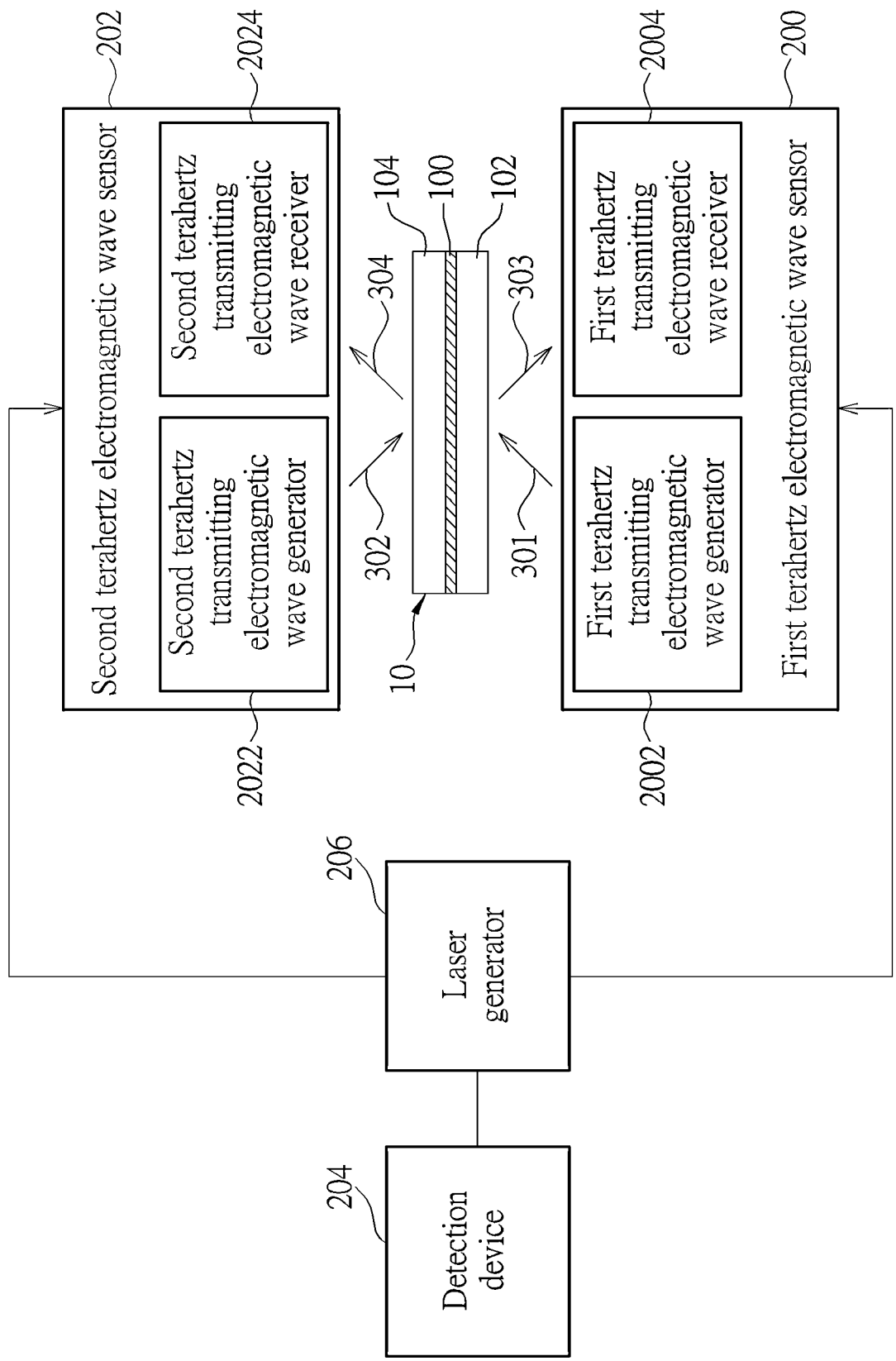
FIG. 3 is a schematic diagram illustrating a cylindrical shell of a metal material detected by a cylindrical shell detection device according to an embodiment of the present invention.
Figure 4:
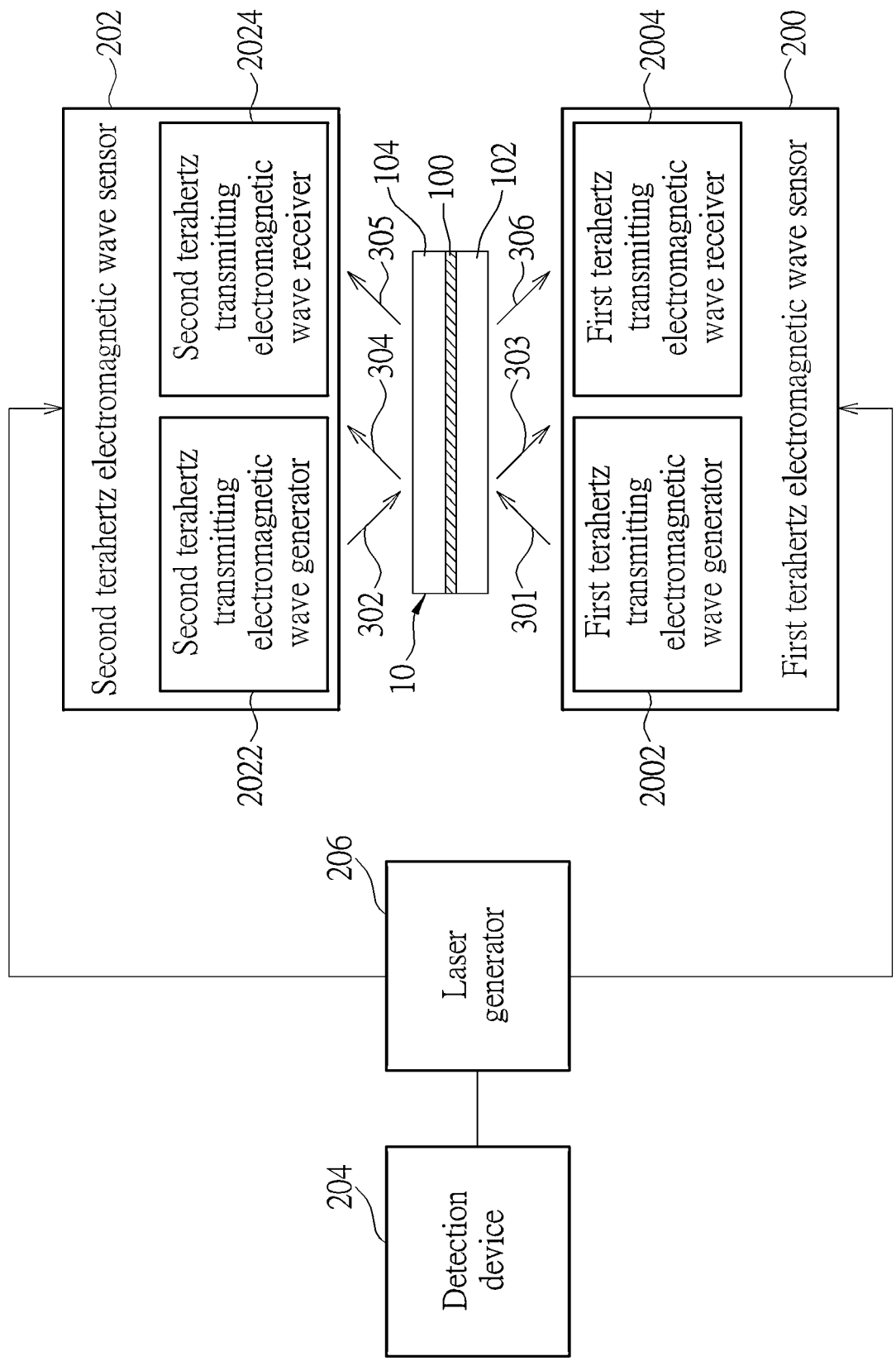
FIG. 4 is a schematic diagram illustrating a cylindrical shell of a non-metal material detected by a cylindrical shell detection device according to an embodiment of the present invention.

FIG. 3 and FIG. 4 are schematic diagrams of the first transmitting electromagnetic wave 301 and the second terahertz transmitting electromagnetic wave 302 respectively emitted to the inner side surface and the outer side surface of the solid rocket thruster 10, and the first terahertz reflected electromagnetic wave 303 and the second terahertz reflected electromagnetic wave 304 corresponding to the first transmitting electromagnetic wave 301 and the second terahertz transmitting electromagnetic wave 302 according to the embodiment of the present invention. As shown in FIG. 3 and FIG. 4, the solid rocket thruster 10 is composed of the cylindrical shell 100, the inner thermal-insulating flame-retardant layer 102 and the outer thermal-insulating layer 104, wherein the cylindrical shell 100 is located between the inner thermal-insulating flame-retardant layer 102 and the outer thermal-insulating layer 104. In other words, the inner thermal-insulating flame-retardant layer 102 is located on the inner side surface of the solid rocket thruster 10, and the outer thermal-insulating layer 104 is located on the outer side surface of the solid rocket thruster 10. When the solid rocket thruster 10 flies at the high speed, high temperature is generated by friction with the air, and the combustion of the solid propellant also generates high temperature and high pressure in the combustion chamber in the solid rocket thruster 10. Therefore, the inner thermal-insulating flame-retardant layer 102 and the outer thermal-insulating layer 104 may be composed of nitrile rubber (NBR), polyurethane (PU), ethylene-propylene-diene-monomer rubber (EPDM) and elastomeric heat shielding materials (EHSM), but not limited thereto. It should be noted that, the inner thermal-insulating flame-retardant layer 102 and the outer thermal-insulating layer 104 may also respectively include the plurality of inner interface layers and the plurality of outer interface layers and are composed of the above-mentioned materials.

Specifically, the first terahertz electromagnetic wave sensor 200 includes a first terahertz transmitting electromagnetic wave generator 2002 and a first terahertz transmitting electromagnetic wave receiver 2004, the second terahertz electromagnetic wave sensor 202 includes a second terahertz transmitting electromagnetic wave generator 2022 and a second terahertz transmitting electromagnetic wave receiver 2024. When the first transmitting electromagnetic wave 301 and the second terahertz transmitting electromagnetic wave 302 generated by the first terahertz transmitting electromagnetic wave generator 2002 and the second terahertz transmitting electromagnetic wave receiver 2024 are respectively emitted to the plurality of inner interface layers and the plurality of outer interface layers of the solid rocket thruster 10, each inner interface layer of the plurality of inner interface layers and the plurality of outer interface layers may be reflective or penetrated. Accordingly, the first terahertz transmitting electromagnetic wave receiver 2004 and the second terahertz transmitting electromagnetic wave receiver 2024 are utilizing to detect the plurality of terahertz electromagnetic waves reflected or penetrated by the first transmitting electromagnetic wave 301 and the second terahertz transmitting electromagnetic wave 302.

In an embodiment, as shown in FIG. 3, the cylindrical shell 100 may be composed of steel, aluminum and other metal materials. It should be noted that, the terahertz electromagnetic waves with a frequency of $10^{11}$ Hz-$10^{13}$ Hz cannot pass through metal materials. In other words, the first transmitting electromagnetic wave 301 and the second terahertz transmitting electromagnetic wave 302 cannot penetrate through the cylindrical shell 100 after penetrating through the plurality of inner interface layers and the plurality of outer interface layers. Therefore, the first terahertz transmitting electromagnetic wave receiver 2004 may only receive the plurality of first terahertz reflected electromagnetic waves 303 transmitted back by the first transmitting electromagnetic wave 301 being reflected by or penetrated through the plurality of inner interface layers. By the same token, the second terahertz transmitting electromagnetic wave receiver 2024 may only receive the plurality of second terahertz reflected electromagnetic waves 304 transmitted back by the second terahertz transmitting electromagnetic wave 302 being reflected by or penetrated through the plurality of outer interface layers. In this situation, the detection device 204 may measure the plurality of first characteristic signals, and analyze the plurality of first characteristic signals to determine the plurality of first characteristics of the plurality of inner interface layers according to the first transmitting electromagnetic wave 301 and the plurality of first terahertz reflected electromagnetic waves 303 received by the first terahertz transmitting electromagnetic wave receiver 2004. By the same token, the detection device 204 may measure the plurality of second characteristic signals, and analyze the plurality of second characteristic signals to determine the plurality of second characteristics of the plurality of outer interface layers according to the second terahertz transmitting electromagnetic wave 302 and the plurality of second terahertz reflected electromagnetic waves 304 received by the second terahertz transmitting electromagnetic wave receiver 2024.

In another embodiment, as shown in FIG. 4, the cylindrical shell 100 may be composed of non-metallic materials such as plastics, ceramics and quartz. It should be noted that, the terahertz electromagnetic waves with frequency of $10^{11}$ Hz-$10^{13}$ Hz may penetrate through non-metallic materials. In other words, after the first transmitting electromagnetic wave 301 and the second transmitting electromagnetic wave 302 are respectively emitted to the inner side surface and the outer side surface of the solid rocket thruster 10, the first transmitting electromagnetic wave 301 and the second terahertz transmitting electromagnetic wave 302 may be reflected or penetrated at each interface layer of the plurality of inner interface layers, the cylindrical shell 100 and the plurality of outer interface layers. Therefore, the first terahertz transmitting electromagnetic wave receiver 2004 may not only receive the plurality of first terahertz reflected electromagnetic waves 303 transmitted back by the first transmitting electromagnetic wave 301 being reflected or penetrated through the plurality of inner interface layers, the cylindrical shell 100 and the plurality of outer interface layers, but also a plurality of second terahertz penetrating electromagnetic waves 306 transmitted by the second terahertz transmitting electromagnetic wave 302 being reflected by or penetrated through the plurality of outer interface layers, the cylindrical shell 100 and the plurality of inner interface layers. By the same token, the second terahertz transmitting electromagnetic wave receiver 2024 may not only receive the plurality of second terahertz reflected electromagnetic waves 304 transmitted back by the second terahertz transmitting electromagnetic wave 302 being reflected by or penetrated through the plurality of outer interface layers, but also a plurality of first terahertz penetrating electromagnetic waves 305 transmitted by the first transmitting electromagnetic wave 301 being reflected by or penetrated through the plurality of inner interface layers, the cylindrical shell 100 and the plurality of outer interface layers. In this situation, the detection device 204 may measure the plurality of first characteristic signals and the plurality of second characteristic signals according to the first transmitting electromagnetic wave 301, the second terahertz transmitting electromagnetic wave 302, the plurality of first terahertz reflected electromagnetic waves 303, the plurality of second terahertz reflected electromagnetic waves 304, the plurality of first terahertz penetrating electromagnetic waves 305 and the plurality of second terahertz penetrating electromagnetic waves 306. Furthermore, the detection device 204 may analyze the plurality of first characteristic signals and the plurality of second characteristic signals to determine the plurality of first characteristics of the plurality of inner interface layers, a shell characteristic of the cylindrical shell 100 and the plurality of second characteristics of the plurality of outer interface layers.

Figure 5:
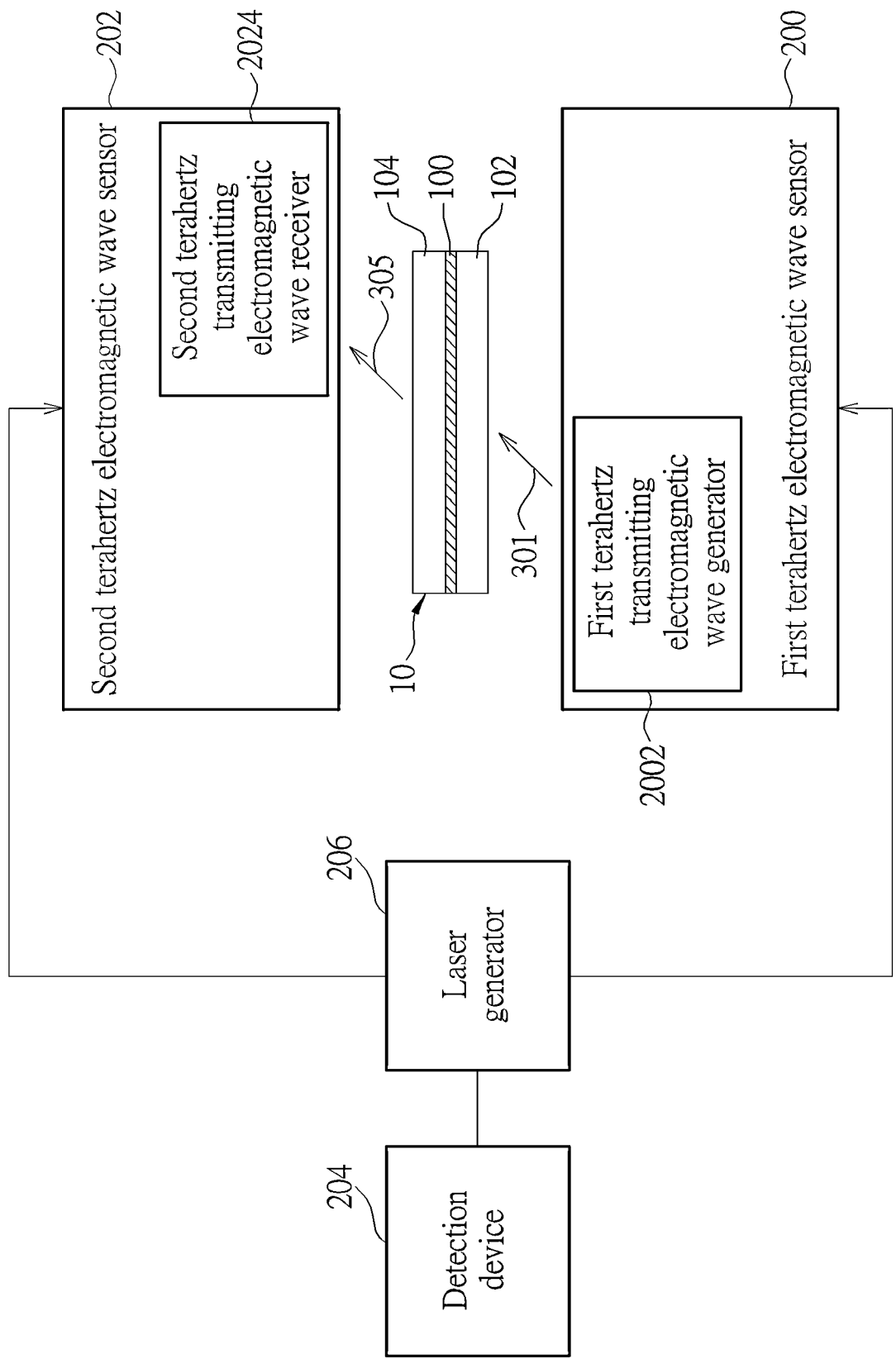
FIG. 5 is a schematic diagram illustrating a solid cylindrical shell of a non-metal material detected by the cylindrical shell detection device according to another embodiment of the present invention.

In another embodiment, as shown in FIG. 5, the cylindrical shell 100 may be composed of non-metallic materials such as plastics, ceramics and quartz. It should be noted that, the first terahertz electromagnetic wave sensor 200 only includes the first terahertz transmitting electromagnetic wave generator 2002, and the second terahertz electromagnetic wave sensor 202 only includes the second terahertz transmitting electromagnetic wave receiver 2024. In other words, after the first transmitting electromagnetic wave 301 is emitted to the inner side surface of the solid rocket thruster 10, the first transmitting electromagnetic wave 301 may be reflected or penetrated in each interface layer of the plurality of inner interface layers, the cylindrical shell 100 and the plurality of outer interface layers. The second terahertz transmitting electromagnetic wave receiver 2024 may receive the plurality of first terahertz penetrating electromagnetic waves 305. In this situation, the detection device 204 may measure the plurality of first characteristic signals and the plurality of second characteristic signals according to the first transmitting electromagnetic wave 301 and the plurality of first terahertz penetrating electromagnetic waves 305. Furthermore, the detection device 204 may analyze the plurality of first characteristic signals and the plurality of second characteristic signals to determine the plurality of first characteristics of the plurality of inner interface layers, the shell characteristic of the cylindrical shell 100 and the plurality of second characteristics of the plurality of outer interface layers. Similarly, after the first transmitting electromagnetic wave is emitted to the outer side surface of the solid rocket thruster 10, the second terahertz transmitting electromagnetic wave receiver 2024 may receive the plurality of first terahertz penetrating electromagnetic waves from the inner side surface of the solid rocket thruster 10. For the detailed description, please refer to the above-mentioned description, which will not be repeated here.

On the other hand, in an embodiment, the detection device 204 may measure transient electrical fields of the plurality of first terahertz reflected electromagnetic waves 303, the plurality of second terahertz reflected electromagnetic waves 304, the plurality of first terahertz penetrating electromagnetic waves 305 and the plurality of second terahertz penetrating electromagnetic waves 306 in the time domain to obtain an electric field strength and an electric field phase. The electric field strength and the electric field phase are very sensitive to material properties. Through Fourier transform, a plurality of complex permittivities of the material may be directly measured, and the optical coefficient and structural properties of the material may also be calculated. In another embodiment, the detection device 204 may measure a Time of Flight of the plurality of first terahertz reflected electromagnetic waves 303, the plurality of second terahertz reflected electromagnetic waves 304, the plurality of first terahertz penetrating electromagnetic waves 305 and the plurality of second terahertz penetrating electromagnetic waves 306, and analyze the Time of Flight to determine thickness of each interface layer of the plurality of inner interface layers, the cylindrical shell 100 and the plurality of outer interface layers. It should be noted that, the detection device 204 may further analyze the characteristic signals such as the electric field strength and the electric field phase to determine the thickness, an electrical coefficient and an optical coefficient of each interface layer of the plurality of inner interface layers, the cylindrical shell 100 and the plurality of outer interface layers. In addition, the electrical coefficient may be a charge carrier mobility or a permittivity, and the optical coefficient may be an absorptivity, a refractive index or a reflectance, but not limit thereto.

In another embodiment, the cylindrical shell detection device 20 may guide the first transmitting electromagnetic wave 301 and the second terahertz transmitting electromagnetic wave 302 to be emitted to any position of the solid rocket thruster 10 through the cylindrical shell bracket 212, the inner sensing bracket 208 and the outer sensing bracket 210. For example, the cylindrical shell bracket 212, the inner sensing bracket 208 and the outer sensing bracket 210 guide the first transmitting electromagnetic wave 301, the second terahertz transmitting electromagnetic wave 302 to be emitted to a detection range of the solid rocket thruster 10. The detection device 204 may measure the plurality of first characteristic signals and the plurality of second characteristic signals according to the first transmitting electromagnetic wave 301, the second terahertz transmitting electromagnetic wave 302, the plurality of first terahertz reflected electromagnetic waves 303 and the plurality of second terahertz penetrating electromagnetic waves 306 within the detection range received by the first terahertz transmitting electromagnetic wave receiver 2004, and the plurality of second terahertz reflected electromagnetic waves 304 and the plurality of first terahertz penetrating electromagnetic waves 305 within the detection range received by the second terahertz transmitting electromagnetic wave receiver 2024. And the detection device 204 may generate a characteristic distribution of the plurality of inner interface layers, the cylindrical shell 100 and the plurality of outer interface layers within the detection range according to the plurality of first characteristic signals and the plurality of second characteristic signals.

Figure 6:
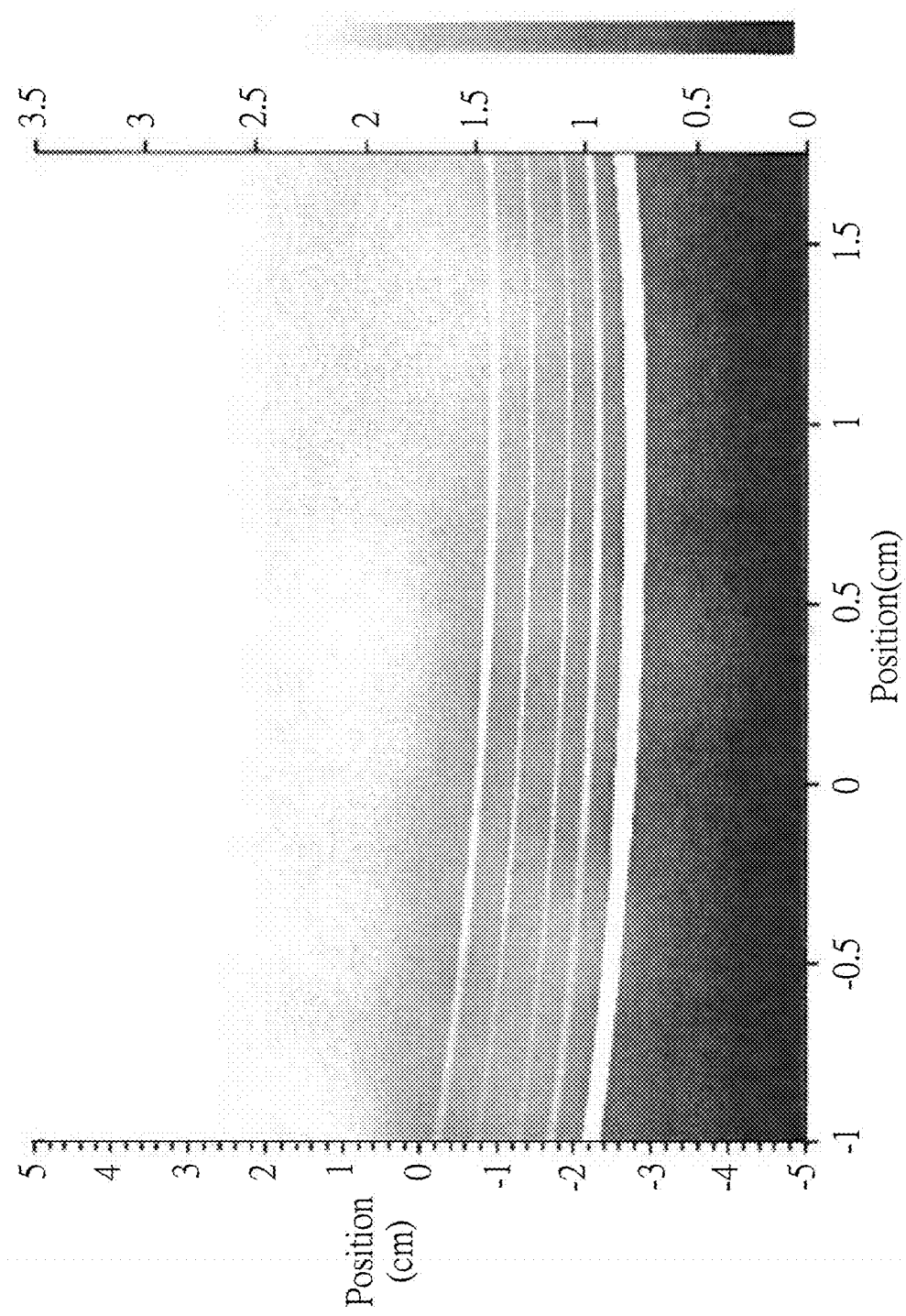
FIG. 6 is a schematic diagram illustrating a line scan of the electric field intensity distribution within a detection range according to an embodiment of the present invention.
Figure 7:
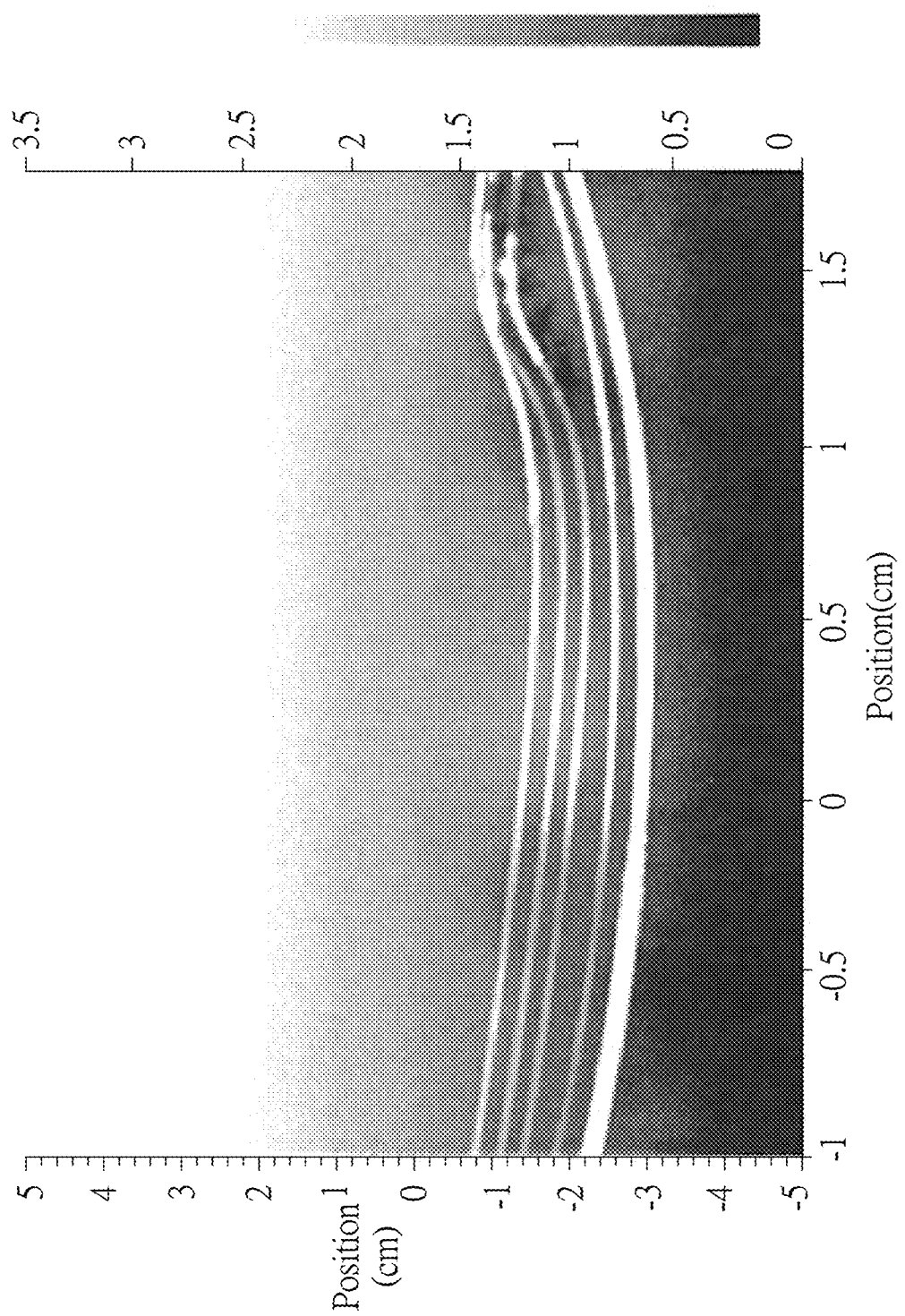
FIG. 7 is a schematic diagram illustrating a line scan of the electric field intensity distribution within a detection range according to another embodiment of the present invention.

For example, FIG. 6 and FIG. 7 are schematic diagrams illustrating a line scan (b-scan) of the electric field strength distribution of the plurality of first terahertz reflected electromagnetic waves 303, the plurality of second terahertz reflected electromagnetic waves 304, the plurality of first terahertz penetrating electromagnetic waves 305 and the plurality of second terahertz penetrating electromagnetic waves 306 corresponding to defects of different conditions within the detection range. Comparing the electric field strength distributions in FIG. 6 and FIG. 7, the distribution of the interface layer is not uniform in the region on the right side of the detection range in FIG. 7.

Figure 8:
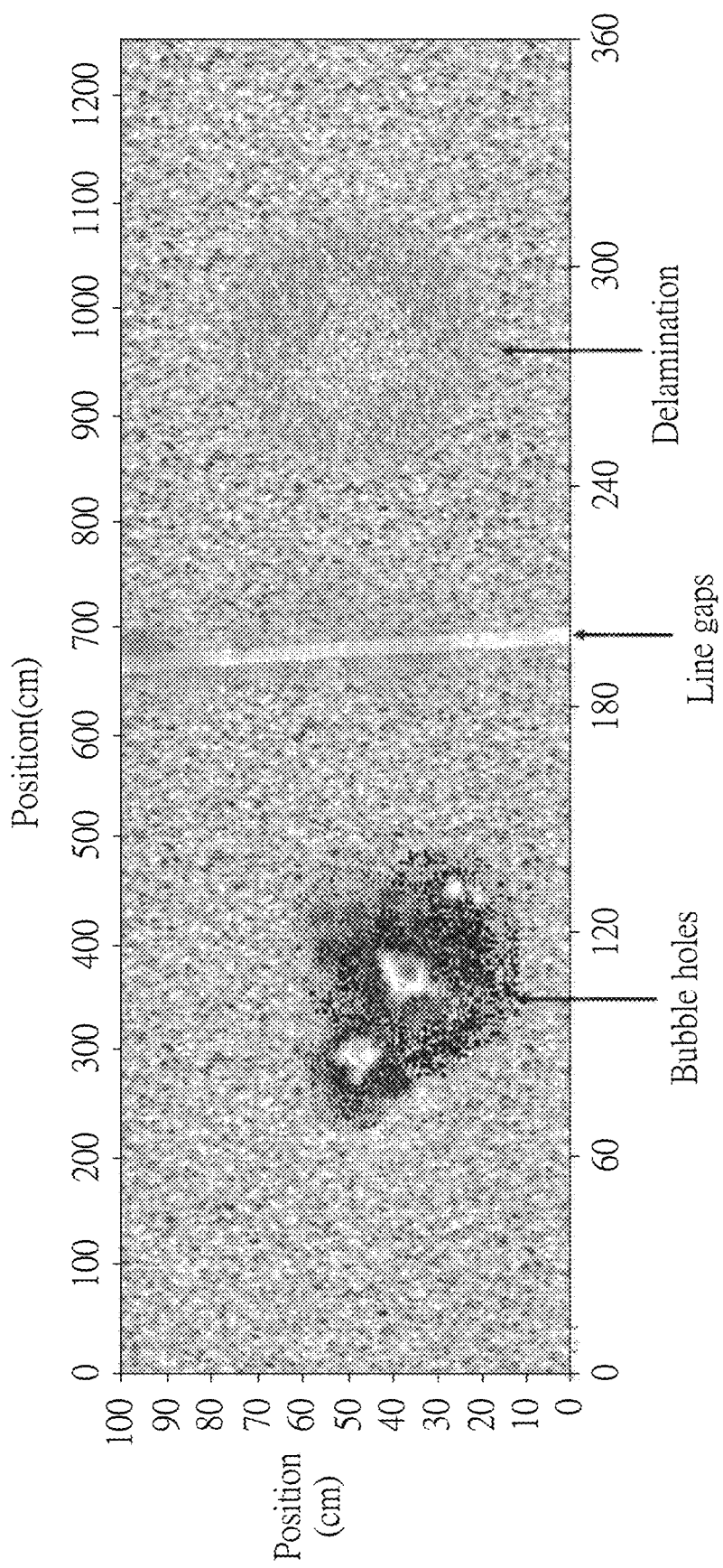
FIG. 8 is a schematic diagram illustrating a surface scan of the electric field intensity distribution in a detection range according to an embodiment of the present invention.
Figure 9:
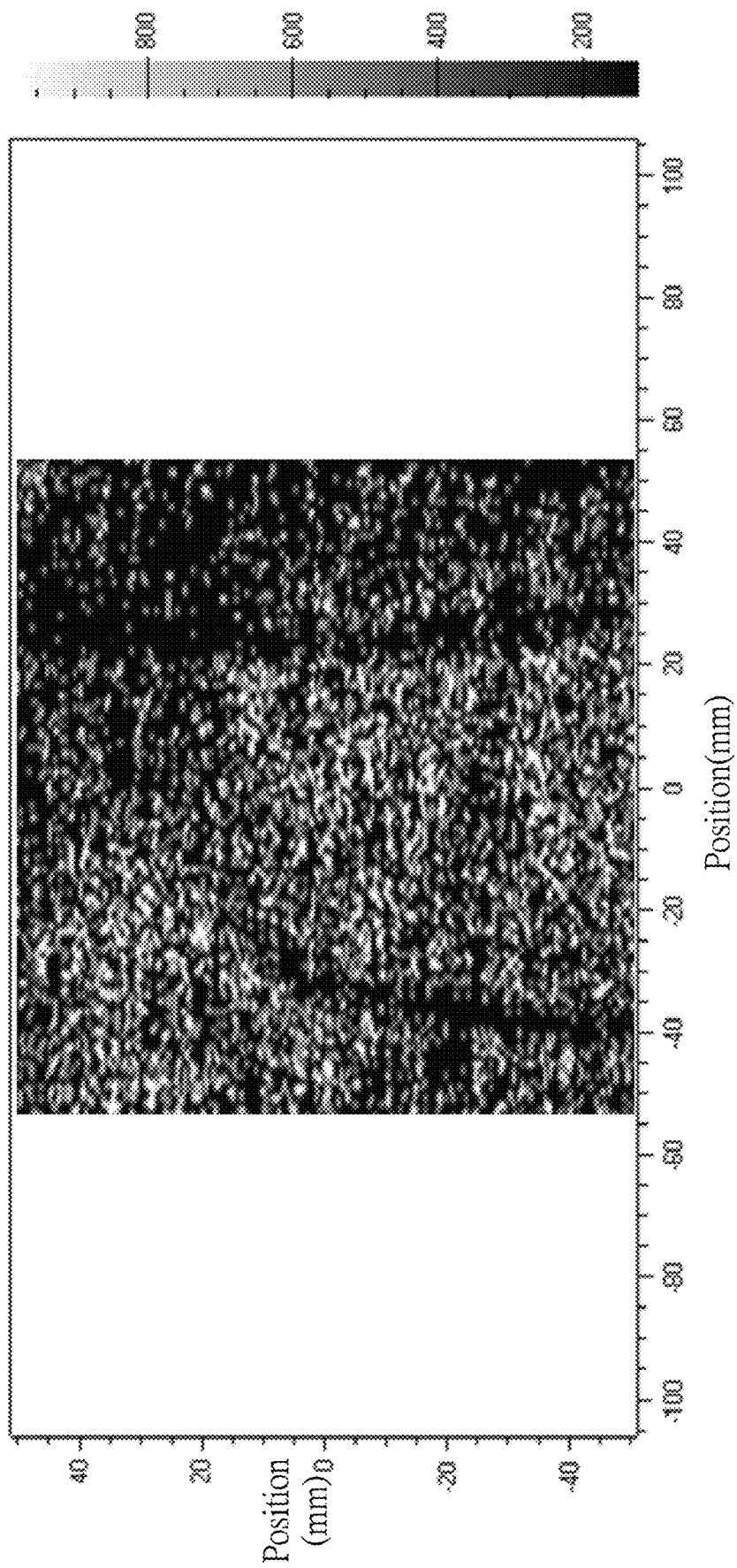
FIG. 9 is a schematic diagram illustrating a surface scan of the electric field intensity distribution in a detection range according to another embodiment of the present invention.

For another example, FIG. 8 and FIG. 9 are schematic diagrams illustrating a surface scan (c-scan) of the electric field strength distribution of the plurality of first terahertz reflected electromagnetic waves 303, the plurality of second terahertz reflected electromagnetic waves 304, the plurality of first terahertz penetrating electromagnetic waves 305 and the plurality of second terahertz penetrating electromagnetic waves 306 corresponding to defects of different conditions within the detection range. FIG. 8 illustrates that there are defects such as bubble holes, line gaps and delamination within the detection range, wherein the bubble holes appear as light-white round holes, the line gaps appear as light-white or darker strip-like areas, and the delamination appear as a large area and a different color difference from the surrounding. FIG. 9 illustrates that the thermal insulation and flame retardant layer contains metal or impurities within the detection range, e.g., the defect of the "A" font in FIG. 9.

Figure 10:
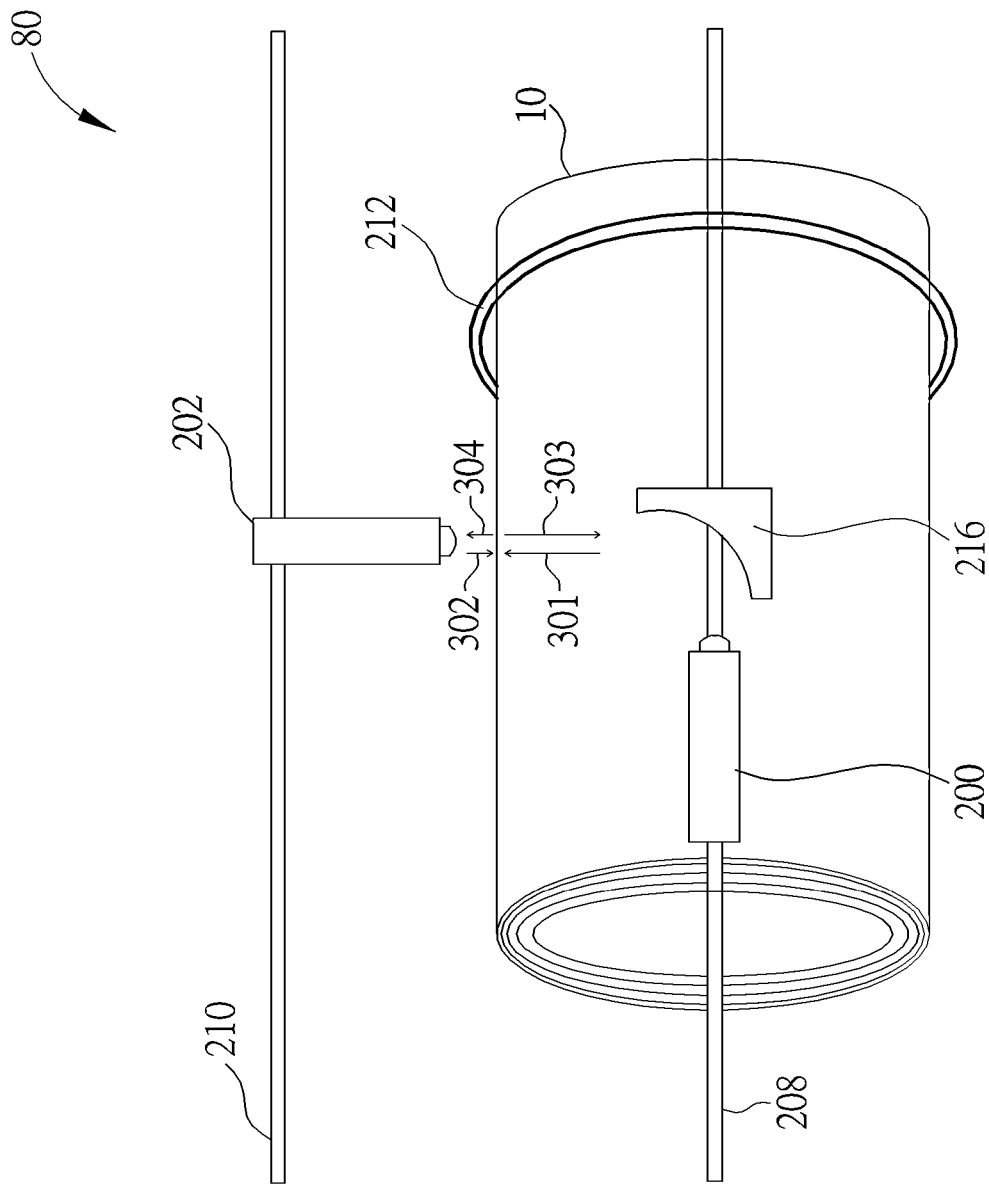
FIG. 10 is a schematic diagram illustrating an inner lens according to an embodiment of the present invention.

In addition, in an embodiment, the cylindrical shell detection device 20 further includes a reflector 216 as shown in FIG. 10. When an interior space of the solid rocket thruster 10 is too small, the first terahertz electromagnetic wave sensor 200 may be configured in parallel on the inner sensing bracket 208, and the reflector 216 is configured on the inner sensing bracket 208. As such, the terahertz transmitting electromagnetic wave emitted by the first terahertz electromagnetic wave sensor 200 may be emitted to the inner side surface of the solid rocket thruster 10 through the reflector 216 and perpendicular to the section of the cylindrical shell 100. The cylindrical shell detection device 20 may analyze the first transmitting electromagnetic wave 301, the second terahertz transmitting electromagnetic wave 302, the first terahertz reflected electromagnetic wave 303 and the second terahertz reflected electromagnetic wave 304 emitted to the solid rocket thruster 10.

On the other hand, the design of the first terahertz transmitting electromagnetic wave generator 2002 and the first terahertz transmitting electromagnetic wave receiver 2004 may be realized through a Photoconductive Antenna, a Nonlinear Crystal or other devices. And the first terahertz transmitting electromagnetic wave generator 2002 and the first terahertz transmitting electromagnetic wave receiver 2004 are not limited to the same type. For example, the first terahertz transmitting electromagnetic wave generator 2002 is realized as the Photoconductive Antenna and the first terahertz transmitting electromagnetic wave receiver 2004 is realized as the Nonlinear Crystal. Similarly, the designs of the second terahertz transmitting electromagnetic wave generator 2022 and the second terahertz transmitting electromagnetic wave receiver 2024 and the optical elements on the optical path are known in the art, and will not be repeated here.

In addition, the above-mentioned embodiments are used to illustrate the concept of the present invention, and those skilled in the art may make various modifications accordingly, but are not limited thereto. Therefore, as long as the reflected or penetrated terahertz received electromagnetic waves are obtained after the cylindrical shell detection method and device emit the terahertz electromagnetic waves to the plurality of interface layers of the cylindrical shell, and the characteristics of the cylindrical shell are analyzed by time domain method, then the requirements of the present invention are satisfied and belong to the scope of the present invention.

Figure 11:
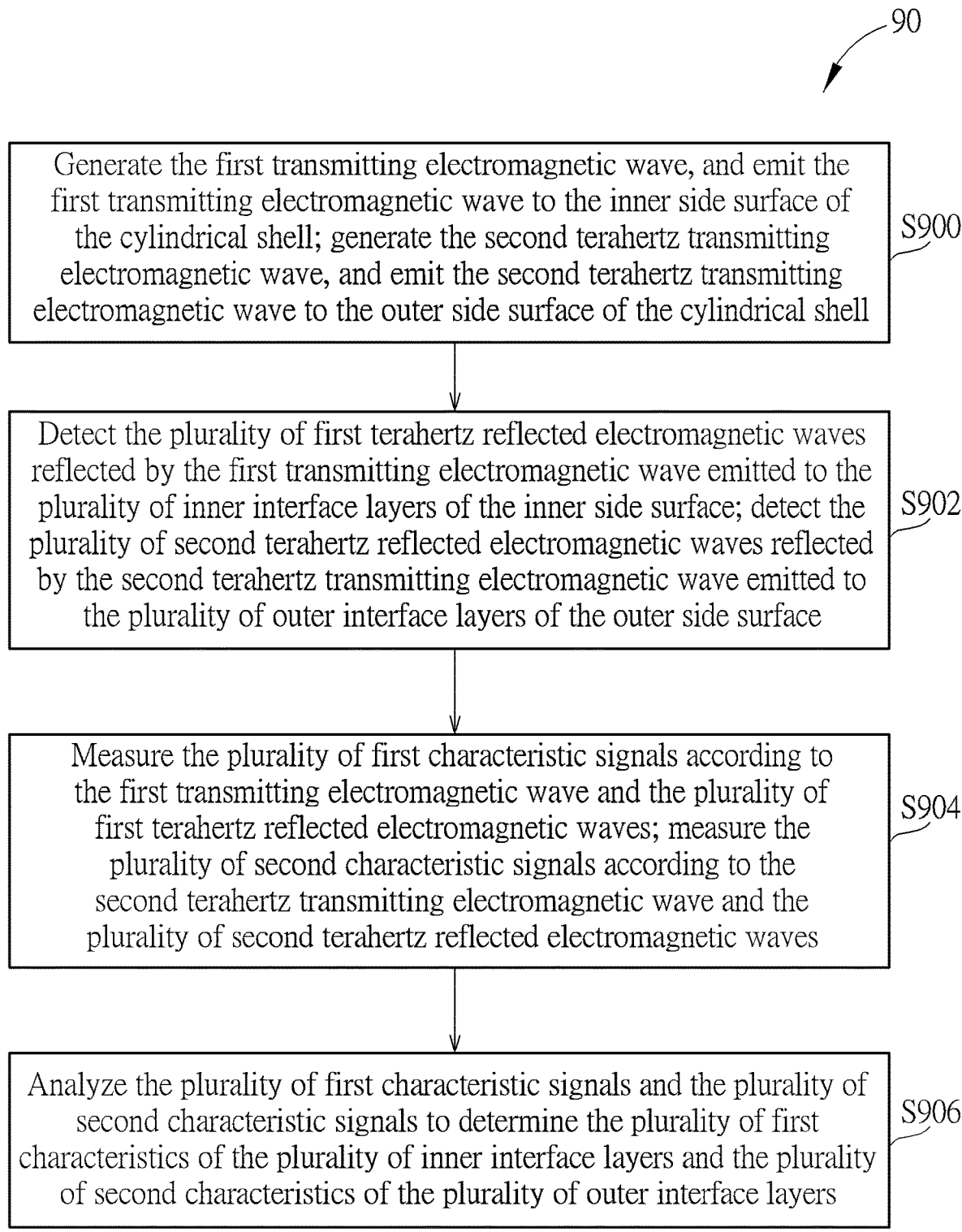
FIG. 11 is a flowchart of the cylindrical shell detection method according to another embodiment of the present invention.

Finally, the operations of the cylindrical shell detection device 20 can be summarized as a cylindrical shell detection process 90, as shown in FIG. 11. The cylindrical shell detection process 90 includes the following steps:

Step S900: Generate the first transmitting electromagnetic wave, and emit the first transmitting electromagnetic wave to the inner side surface of the cylindrical shell; generate the second terahertz transmitting electromagnetic wave, and emit the second terahertz transmitting electromagnetic wave to the outer side surface of the cylindrical shell.

Step S902: Detect the plurality of first terahertz reflected electromagnetic waves reflected by the first transmitting electromagnetic wave emitted to the plurality of inner interface layers of the inner side surface; detect the plurality of second terahertz reflected electromagnetic waves reflected by the second terahertz transmitting electromagnetic wave emitted to the plurality of outer interface layers of the outer side surface.

Step S904: Measure the plurality of first characteristic signals according to the first transmitting electromagnetic wave and the plurality of first terahertz reflected electromagnetic waves; measure the plurality of second characteristic signals according to the second terahertz transmitting electromagnetic wave and the plurality of second terahertz reflected electromagnetic waves.

Step S906: Analyze the plurality of first characteristic signals and the plurality of second characteristic signals to determine the plurality of first characteristics of the plurality of inner interface layers and the plurality of second characteristics of the plurality of outer interface layers.

The detail description of the process 90 is as described above, and will not be repeated here.

In summary, the cylindrical shell detection device of the present invention may utilize the terahertz electromagnetic waves to identify the defects of the outer thermal insulation layer and the inner thermal insulation and flame retardant layer of the rocket thruster, to identify whether the outer thermal insulation layer and the inner thermal insulation and flame retardant layer contain impurities, or to identify whether the rocket thruster is manufactured according to the design plan before filling the solid propellant into the solid rocket thruster. In this way, the present invention can help engineers to process and remove the internal defects of the rocket thrusters.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cylindrical shell detection method, comprising:
   generating a first terahertz transmitting electromagnetic wave, and emitting the first transmitting electromagnetic wave to an inner side surface of a cylindrical shell, wherein the inner side surface comprises a plurality of inner interface layers;
   generating a second terahertz transmitting electromagnetic wave, and emitting the second terahertz transmitting electromagnetic wave to an outer side surface of the cylindrical shell, wherein the outer side surface comprises a plurality of outer interface layers;
   detecting a plurality of first terahertz reflected electromagnetic waves reflected by the first transmitting electromagnetic wave emitted to the plurality of inner interface layers of the inner side surface;
   detecting a plurality of second terahertz reflected electromagnetic waves reflected by the second terahertz transmitting electromagnetic wave emitted to the plurality of outer interface layers of the outer side surface;
   measuring a plurality of first characteristic signals according to the first transmitting electromagnetic wave and the plurality of first terahertz reflected electromagnetic waves;
   measuring a plurality of second characteristic signals according to the second terahertz transmitting electromagnetic wave and the plurality of second terahertz reflected electromagnetic waves; and
   analyzing the plurality of first characteristic signals and the plurality of second characteristic signals to determine a plurality of first characteristics of the plurality of inner interface layers and a plurality of second characteristics of the plurality of outer interface layers;
   wherein the cylindrical shell comprises a middle interface layer, and the middle interface layer is between the plurality of inner interface layers and the plurality of outer interface layers.

2. The cylindrical shell detection method of claim 1, wherein the first transmitting electromagnetic wave and the second terahertz transmitting electromagnetic wave are capable of penetrating through the middle interface layer, and the cylindrical shell detection method further comprises:
   detecting a plurality of first terahertz penetrating electromagnetic waves penetrated by the first transmitting electromagnetic wave emitted to the inner side surface;
   detecting a plurality of second terahertz penetrating electromagnetic waves penetrated by the second terahertz transmitting electromagnetic wave emitted to the outer side surface;
   measuring the plurality of first characteristic signals and the plurality of second characteristic signals according to the first transmitting electromagnetic wave, the second terahertz transmitting electromagnetic wave, the plurality of first terahertz reflected electromagnetic waves, the plurality of second terahertz reflected electromagnetic waves, the plurality of first terahertz penetrating electromagnetic waves and the plurality of second terahertz penetrating electromagnetic waves; and
   analyzing the plurality of first characteristic signals and the plurality of second characteristic signals to determine the plurality of first characteristics of the plurality of inner interface layers and the plurality of second characteristics of the plurality of outer interface layers.

3. The cylindrical shell detection method of claim 1, wherein the first transmitting electromagnetic wave and the second terahertz transmitting electromagnetic wave are a terahertz pulse wave having a frequency of $10^{11}$ Hz-$10^{13}$ Hz.

4. The cylindrical shell detection method of claim 1, wherein the plurality of first characteristic signals and the plurality of second characteristic signals comprise at least one of an electric field strength and an electric field phase of each first terahertz reflected electromagnetic wave and each second terahertz reflected electromagnetic wave, and a time of flight between the plurality of first terahertz reflected electromagnetic waves and between the plurality of second terahertz reflected electromagnetic waves.

5. The cylindrical shell detection method of claim 1, wherein the plurality of first characteristics and the plurality of second characteristics comprises at least one of a thickness, an electrical coefficient and an optical coefficient of each interface layer of the plurality of inner interface layers and the plurality of outer interface layers.

6. The cylindrical shell detection method of claim 1, further comprising:
repeatedly emitting the first transmitting electromagnetic wave and the second terahertz transmitting electromagnetic wave to a detection range of the cylindrical shell; and
generating a characteristic distribution of the plurality of inner interface layers and the plurality of outer interface layers within the detection range according to the plurality of first characteristics and the plurality of second characteristics.

7. A cylindrical shell detection device, comprising:
a first terahertz transmitting electromagnetic wave generator, configured to generate a first transmitting electromagnetic wave and emit the first transmitting electromagnetic wave to an inner side surface of a cylindrical shell, wherein the inner side surface comprises a plurality of inner interface layers;
a second terahertz transmitting electromagnetic wave generator, configured to generate a second terahertz transmitting electromagnetic wave and emit the second terahertz transmitting electromagnetic wave to an outer side surface of the cylindrical shell, wherein the outer side surface comprises a plurality of outer interface layers;
a first terahertz transmitting electromagnetic wave receiver, configured to detect a plurality of first terahertz reflected electromagnetic waves reflected by the first transmitting electromagnetic wave emitted to the plurality of inner interface layers of the inner side surface;
a second terahertz transmitting electromagnetic wave receiver, configured to detect a plurality of second terahertz reflected electromagnetic waves reflected by the second terahertz transmitting electromagnetic wave emitted to the plurality of outer interface layers of the outer side surface;
a detection device, coupled to the first terahertz transmitting electromagnetic wave generator, the second terahertz transmitting electromagnetic wave generator, the first terahertz transmitting electromagnetic wave receiver and the second terahertz transmitting electromagnetic wave receiver, configured to measure the plurality of first characteristic signals and the plurality of second characteristic signals, to determine a plurality of first characteristics of the plurality of inner interface layers and a plurality of second characteristics of the plurality of outer interface layers according to the first transmitting electromagnetic wave, the plurality of first terahertz reflected electromagnetic waves, the second terahertz transmitting electromagnetic wave and the plurality of second terahertz reflected electromagnetic waves;
a cylindrical shell bracket, coupled to the cylindrical shell, configured to guide the cylindrical shell to rotate around an inner axial direction;
an inner sensing bracket, coupled to the first terahertz transmitting electromagnetic wave generator and the first terahertz transmitting electromagnetic wave receiver, configured to guide the first terahertz transmitting electromagnetic wave generator and the first terahertz transmitting electromagnetic wave receiver to move along the inner axial direction; and
an outer sensing bracket, coupled to the second terahertz transmitting electromagnetic wave generator and the second terahertz transmitting electromagnetic wave receiver, configured to guide the second terahertz transmitting electromagnetic wave generator and the second terahertz transmitting electromagnetic wave receiver moves along a outer axial direction.

8. The cylindrical shell detection device of claim 7, wherein the cylindrical shell bracket, the inner sensing bracket and the outer sensing bracket guide the cylindrical shell, the first terahertz transmitting electromagnetic wave generator, the first terahertz transmitting electromagnetic wave receiver, the second terahertz transmitting electromagnetic wave generator and the second terahertz transmitting electromagnetic wave receiver to move, so that the cylindrical shell is separated from the first terahertz transmitting electromagnetic wave generator, the first terahertz transmitting electromagnetic wave receiver, the second terahertz transmitting electromagnetic wave generator and the second terahertz transmitting electromagnetic wave receiver by a specific distance.

9. The cylindrical shell detection device of claim 7, wherein the cylindrical shell comprises a middle interface layer, and the middle interface layer is between the plurality of inner interface layers and the plurality of outer interface layers.

10. The cylindrical shell detection device of claim 9, wherein the first transmitting electromagnetic wave and the second terahertz transmitting electromagnetic wave can penetrate through the middle interface layer, the first terahertz transmitting electromagnetic wave receiver is further configured to detect a plurality of first terahertz penetrating electromagnetic waves penetrated by the first transmitting electromagnetic wave emitted to the inner side surface, the second terahertz transmitting electromagnetic wave receiver is further configured to detect a plurality of second terahertz penetrating electromagnetic waves penetrated by the second terahertz transmitting electromagnetic wave emitted to the outer side surface, and the detection device is further configured to measure the plurality of first characteristic signals and the plurality of second characteristic signals according to the first transmitting electromagnetic wave, the second terahertz transmitting electromagnetic wave, the plurality of first terahertz reflected electromagnetic waves, the plurality of second terahertz reflected electromagnetic waves, the plurality of first terahertz penetrating electromagnetic waves and the plurality of second terahertz penetrating electromagnetic waves, and to analyze the plurality of first characteristic signals and the plurality of second characteristic signals to determine the plurality of first characteristics of the plurality of inner interface layers and the plurality of second characteristics of the plurality of outer interface layers.

11. The cylindrical shell detection device of claim 7, wherein the first transmitting electromagnetic wave and the second terahertz transmitting electromagnetic wave are a terahertz pulse wave having a frequency of $10^{11}$ Hz-$10^{13}$ Hz.

12. The cylindrical shell detection device of claim 7, wherein the plurality of first characteristic signals and the plurality of second characteristic signals comprise at least one of an electric field strength and an electric field phase of each first terahertz reflected electromagnetic wave and each second terahertz reflected electromagnetic wave, and a time of flight between the plurality of first terahertz reflected electromagnetic waves and between the plurality of second terahertz reflected electromagnetic waves.

13. The cylindrical shell detection device of claim 7, wherein the plurality of first characteristics and the plurality of second characteristics comprises at least one of a thickness, an electrical coefficient and an optical coefficient of each interface layer of the plurality of inner interface layers and the plurality of outer interface layers.

14. A cylindrical shell detection device, comprising:
a first terahertz transmitting electromagnetic wave generator, configured to generate a first transmitting electromagnetic wave and emit the first transmitting electromagnetic wave to an inner side surface of a cylindrical shell, wherein the inner side surface comprises a plurality of inner interface layers;
a first terahertz transmitting electromagnetic wave receiver, configured to detect a plurality of first terahertz penetrating electromagnetic waves penetrated by the first transmitting electromagnetic wave emitted to the plurality of inner interface layers of the inner side surface and penetrating through the cylindrical shell and an outer side surface of the cylindrical shell, wherein the outer side surface comprises a plurality of outer interface layers; and
a detection device, coupled to the first terahertz transmitting electromagnetic wave generator and the first terahertz transmitting electromagnetic wave receiver, configured to measure the plurality of first characteristic signals to determine a plurality of first characteristics of the plurality of inner interface layers and a plurality of second characteristics of the plurality of outer interface layers according to the first transmitting electromagnetic wave and the plurality of first terahertz penetrating electromagnetic waves.

15. The cylindrical shell detection device of claim 14, further comprising:
a cylindrical shell bracket, coupled to the cylindrical shell, configured to guide the cylindrical shell to rotate around an inner axial direction;
an inner sensing bracket, coupled to the first terahertz transmitting electromagnetic wave generator, configured to guide the first terahertz transmitting electromagnetic wave generator to move along the inner axial direction; and
an outer sensing bracket, coupled to the first terahertz transmitting electromagnetic wave receiver, configured to guide the first terahertz transmitting electromagnetic wave receiver to move along an outer axial direction.

16. The cylindrical shell detection device of claim 15, wherein the cylindrical shell bracket, the inner sensing bracket and the outer sensing bracket guide the cylindrical shell, the first terahertz transmitting electromagnetic wave generator and the first terahertz transmitting electromagnetic wave receiver to move, so that the cylindrical shell is separated from the first terahertz transmitting electromagnetic wave generator and the first terahertz transmitting electromagnetic wave receiver by a specific distance.

17. The cylindrical shell detection device of claim 14, wherein the plurality of first characteristic signals comprise at least one of an electric field strength and an electric field phase of each of the plurality of first terahertz penetrating electromagnetic waves, and a time of flight between the plurality of first terahertz penetrating electromagnetic waves.

18. The cylindrical shell detection device of claim 14, wherein the plurality of first characteristics and the plurality of second characteristics comprises at least one of a thickness, an electrical coefficient and an optical coefficient of each interface layer of the plurality of inner interface layers and the plurality of outer interface layers.

* * * * *